M. V. LIDDELL.
SNOWPLOW.
APPLICATION FILED SEPT. 23, 1918.
1,383,409.
Patented July 5, 1921.
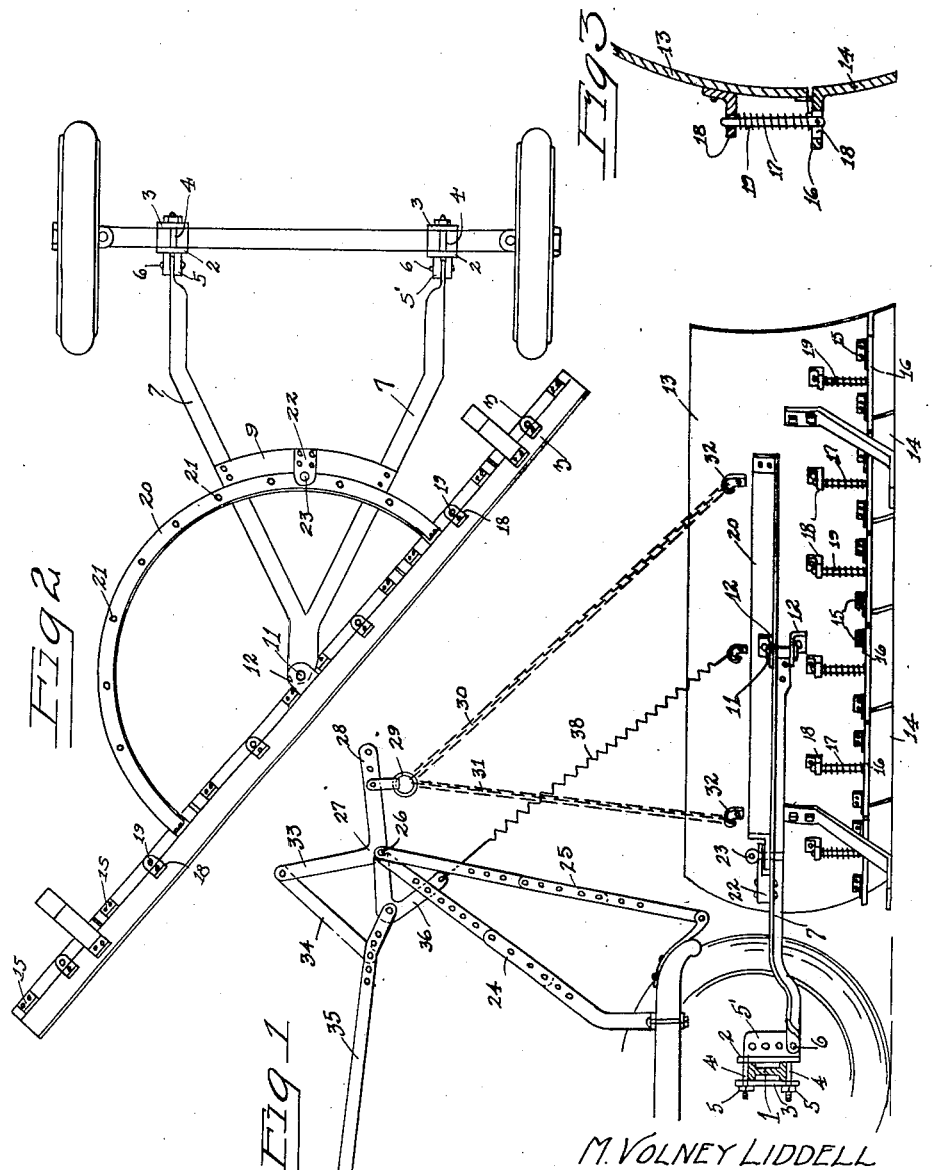
M. VOLNEY LIDDELL
INVENTOR.
WITNESSES:
BY
ATTORNEY.

UNITED STATES PATENT OFFICE.

MICHAEL VOLNEY LIDDELL, OF SPRINGFIELD, ILLINOIS, ASSIGNOR TO BAKER MANUFACTURING COMPANY, OF SPRINGFIELD, ILLINOIS.

SNOWPLOW.

1,383,409.  Specification of Letters Patent.  Patented July 5, 1921.

Application filed September 23, 1918. Serial No. 255,319.

*To all whom it may concern:*

Be it known that I, MICHAEL VOLNEY LIDDELL, a citizen of the United States, residing at Springfield, in the county of Sangamon and State of Illinois, have invented new and useful Improvements in Snowplows, of which the following is a specification.

My invention relates to improvements in snow-plows and refers more particularly to attachments for automobiles for scraping the snow from the front of the car, by means of which an automobile truck may be transformed into a snow-plow.

The primary object of the invention is to provide an attachment of the above character which may be adjusted to operation at a plurality of angles and heights, the scraper blade thereof being equipped with a plurality of independent blade sections having automatic blade-releasing devices thereon whereby the sections when encountering obstructions in the roadway will automatically tip from its normal position to allow the scraper to pass over the obstacle without affecting the remainder of the blades, said devices being adapted to immediately return the blade section to its normal position as soon as the obstacle is cleared.

Another object of the device is to provide simple and efficient means for raising and lowering the scraper blade, whereby an operator seated in the automobile may easily and quickly control the height of the scraper.

My invention comprises the new and useful details of construction and arrangement of parts which will be hereinafter fully described, illustrated in the annexed drawings and pointed out more specifically in the claims hereunto attached.

In the drawings:—

Figure 1 is a side elevation of my scraper attached to an automobile truck. Fig. 2 is a top plan view of my attachment. Fig. 3 is a vertical sectional view through my scraper blade, the view being taken on line 3—3 of Fig. 2.

Referring now to the drawings, wherein like reference characters refer to like or corresponding parts throughout the several views, numeral 1 designates the forward axle of an automobile to which I attach the V-shaped scraper bar supporting frame of my device, the attaching means comprising a pair of vertical plates 2 and 3 clamped, respectively, on the front and rear face of axle 1 by bolts 4 carried by plate 2, nuts 5 being screwed thereon against the rear face of plate 3. Each of the plates 2 is provided with forwardly extending perforated lugs 5′, through which a horizontal connecting pin 6 makes pivotal engagement with the side beams 7 of the supporting frame, a plurality of perforations being provided in lugs 5′ to allow for adjustment of the height of the supporting frame.

The supporting frame projects forward from the axle and comprises the two side beams 7 brought together at their forward ends to form the V-shaped frame, a vertical bearing being provided adjacent the point in which a vertical pivoting pin 11 carried by a pair of spaced apart brackets 12 on the rear face of scraper bar 13. The scraper bar is preferably curved in cross-section, the concaved side being in front.

Scraper bar 13 is provided on its lower edge with a plurality of sectional scraper blades 14 hinged thereto by hinges 15. Each of the blades 14 is provided with a horizontal flange 16 extending rearwardly therefrom, and a pin 17 is pivoted in a slot adjacent the center of the length of each of the blade sections. Pin 17 is adapted to extend in a normally vertical position and passes upward through a perforation in bracket 18 carried on the back of scraper bar 13, a coil expansion spring 19 being carried about said pin and seated on the top of flange 16 and on the lower face of bracket 18. It will be readily seen that when an obstacle is encountered by blades 14, the blade affected will swing rearwardly, and that when such obstruction is cleared that blade will be returned to its normal position by spring 19.

A semi-circular frame 20 is fixed to the back of the scraper bar 13, and an arcuate bridge 9 spanning beams 7 of the supporting frame is provided with a vertically perforated tongue 22 adapted to overlap the convex rear portion of the semi-circle frame, a plurality of radially positioned vertical holes 21 being provided in the semi-circle adapted to register selectively with the perforation in tongue 22. A pin 23 is removably carried in the perforation in the tongue to engage the semi-circular frame in selected positions, thus to provide for the angular adjustment of the scraper.

I provide a compound lever lift, by means of which my scraper may be readily manipulated from the automobile. Numerals 24 designate a pair of supporting arms attached to the side beams of the automobile chassis, which arms are brought together at their upper ends with a second pair of arms 25 fixed to the supporting frame of my device. At the point of union of arms 24 and 25 I provide a horizontal pin 26 about which is pivoted a bell crank 27. Bell crank 27 has a forward leg 28 to which a pendant attaching ring 29 makes engagement with chains 30 and 31 engaged at their lower ends to hooks 32 on the rear face of the scraper bar 1. The upper leg 33 of the bell crank is pivotally connected to a link 34, which link is in turn pivoted to an actuating lever 35 pivoted at its forward end to a bracket 36 held by supporting arms 24. It will be seen that when lever 35 is swung downward at its rear end, bell-crank 27 will be actuated to raise the entire scraper device about pins 6, thus providing for adjustment of the scraper bar as to height of operation.

A coil extension spring 38 is attached at its lower end to the rear face of the scraper bar 13, and at its upper end to the bracket 36, the same tending to assist in raising the scraper bar and to provide a flexible support therefor.

From the foregoing description, it will be readily seen that I have provided an improved scraper attachment for automobiles, capable of adjustment as to height and angle of operation, and that the scraper bar is equipped with a plurality of independent blade sections having automatic releasing devices thereon whereby the encountering of an obstacle will cause the section to recede from its normal position to allow the bar to pass over and then immediately return to its normal position.

Having thus described my invention, what I claim is:—

1. In a device of the class described, a scraper comprising a body; a plurality of blades pivoted to the body for independent rearward swinging movement when any blade encounters a fixed and prominent obstacle, the blades presenting a substantially continuous scraping surface when in normal position; spring means for returning each blade, independently of the others, from a rearwardly swung position to a normal position; a vehicle; and means for assembling the scraper with the vehicle.

2. In a device of the class described, a scraper comprising a body; blades hinged thereto and having rearwardly extended flanges, the lower edges of the blades presenting a continuous scraping surface; brackets on the body; pins pivoted to the flanges and slidable vertically in the brackets; compression springs surrounding the pins and abutting against the brackets and the flanges; arms connected to the body above the blades and terminating in approximately horizontal feet disposed in the same plane with the lower edges of the blades and adapted to bear upon the ground to the rear of the blades; a vehicle; and means for mounting the scraper on the vehicle.

3. In a device of the class described, a vehicle; a support upstanding from the vehicle; means for adjusting the height of the support; a bell crank fulcrumed on the upper end of the support and comprising a forwardly extended leg and an upstanding leg; a rearwardly projecting bracket connected to the support at a common point with the bell crank and including a part extended forwardly with respect to the support; a lever fulcrumed on the rear end of the bracket; a link connecting the lever with the intermediate portion of the bell crank; a scraper; suspension means connecting the scraper with the forwardly extended leg of the bell crank; a retractile spring connecting the scraper with said part of the bracket; a thrust member extended rearwardly from the scraper; and means for pivotally connecting the thrust member with the vehicle for vertical swinging movement.

M. VOLNEY LIDDELL.

Witnesses:
 M. W. BAKER,
 F. D. SILLOWAY.